US010112490B2

(12) United States Patent
Detterbeck

(10) Patent No.: US 10,112,490 B2
(45) Date of Patent: Oct. 30, 2018

(54) HIGH VOLTAGE DEVICE FOR A RAIL VEHICLE

(71) Applicant: SIEMENS AKTIENGESELSCHAFT, Munich (DE)

(72) Inventor: Manfred Detterbeck, Wendelstein (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/323,494

(22) PCT Filed: Jul. 1, 2015

(86) PCT No.: PCT/EP2015/064917
§ 371 (c)(1),
(2) Date: Jan. 3, 2017

(87) PCT Pub. No.: WO2016/001270
PCT Pub. Date: Jan. 7, 2016

(65) Prior Publication Data
US 2017/0136884 A1 May 18, 2017

(30) Foreign Application Priority Data
Jul. 4, 2014 (DE) .......................... 10 2014 213 073

(51) Int. Cl.
B60L 9/24 (2006.01)
B60L 3/00 (2006.01)

(52) U.S. Cl.
CPC ........... B60L 9/24 (2013.01); B60L 3/00 (2013.01); B60L 2200/26 (2013.01)

(58) Field of Classification Search
CPC .................................... B60L 9/24; B60L 3/00
See application file for complete search history.

(56) References Cited

U.S. PATENT DOCUMENTS 1,944,661 A * 1/1934 Kalwitz .................. H02B 1/00
200/305
2,723,933 A * 11/1955 Isenberg ............... H01F 27/324
156/189

(Continued)

FOREIGN PATENT DOCUMENTS

CN 203365622 U * 12/2013
DE 4022086 A1 * 2/1991 ................ B60L 9/24

(Continued)

Primary Examiner — Thienvu Tran
Assistant Examiner — Pinping Sun
(74) Attorney, Agent, or Firm — Laurence Greenberg; Werner Stemer; Ralph Locher

(57) ABSTRACT

A high voltage device for a vehicle, which at least during driving operation is supplied with electric energy from a power system providing a high voltage, having at least one high voltage component which by a main power switching unit is electrically connectable to the power system and a grounding switching device having at least one switching device. In order to increase personal safety during work on the high voltage device in a constructively simple manner, it is proposed that the high voltage component has at least one receiving region in which the switching device is accommodated—at least in a grounding position that grounds at least one active section of the high voltage component.

11 Claims, 2 Drawing Sheets

(56) References Cited

U.S. PATENT DOCUMENTS

| | | | | |
|---|---|---|---|---|
| 4,324,961 A * | 4/1982 | Ristuccia | H01F 27/402 | 218/100 |
| 4,901,070 A * | 2/1990 | Vandevier | E21B 43/128 | 166/66.4 |
| 6,891,303 B2 * | 5/2005 | Leijon | H01F 3/10 | 174/DIG. 14 |
| 7,866,215 B2 * | 1/2011 | Kurtz | G01L 9/0054 | 73/721 |
| 7,982,332 B2 * | 7/2011 | Nelson | B60L 11/1887 | 307/10.1 |
| 8,690,108 B2 | 4/2014 | Detterbeck et al. | | |
| 8,701,809 B2 | 4/2014 | Ikemoto et al. | | |
| 2012/0154090 A1 * | 6/2012 | Noda | B60L 9/16 | 336/148 |
| 2012/0319636 A1 * | 12/2012 | Gattermann | G01M 13/04 | 318/490 |
| 2013/0063067 A1 * | 3/2013 | Tanaka | H01L 25/07 | 318/494 |
| 2014/0160811 A1 * | 6/2014 | Wong | B60L 9/24 | 363/36 |
| 2015/0014110 A1 | 1/2015 | Baumann et al. | | |
| 2015/0219062 A1 * | 8/2015 | Pawlak | F02P 3/0853 | 123/596 |

FOREIGN PATENT DOCUMENTS

| | | |
|---|---|---|
| DE | 102005008212 A1 | 8/2006 |
| DE | 102006015085 A1 | 9/2007 |
| DE | 102009048666 A1 | 3/2011 |
| DE | 102011089812 A1 | 6/2013 |
| EP | 2332785 A1 | 6/2011 |
| GB | 849213 A | 9/1960 |
| RU | 2379202 C2 | 1/2010 |
| WO | 2012098107 A2 | 7/2012 |
| WO | WO 2012098107 A2 * | 7/2012 ................ B60L 9/28 |

* cited by examiner

HIGH VOLTAGE DEVICE FOR A RAIL VEHICLE

BACKGROUND OF THE INVENTION

Field of the Invention

The invention relates to a high voltage device for a vehicle which at least during driving operation is supplied with electrical energy from a power system providing a high voltage, having at least one high voltage component which by means of a main power switching unit can be electrically connected to the power system, and a grounding switching device which has at least one switching means.

Vehicles, in particular rail-bound vehicles, are known which during driving operation are supplied with electrical energy from a power system. The power system here has an electrical line, for example an overhead line or a conductor rail disposed at ground level, with which a current collector is in contact during operation of the vehicle. The voltage carried by the power system is a high voltage typically ranging from 500 V to 30 kV. A main power switching unit is connected downstream of the current collector in a known manner, and is connected upstream of the electrical system of the vehicle and designed to disconnect this from the power system in particular even under load.

Working on the high voltage device of the vehicle calls for stringent safety precautions. In particular it is laid down that energy sources, in particular the power system line and components of the vehicle, which can potentially generate a high voltage even when the vehicle is disconnected from the power system, must be grounded during this type of work. Usually a grounding switching device of the vehicle is provided, which is coupled to the main power switching unit and serves to electrically connect the input and output of the main power switching unit, i.e. electrical connections thereof to the current collector on the one hand and to the downstream electrical system of the vehicle on the other hand, to a reference potential, in particular the frame potential of the vehicle. This type of grounding switching device is typically insulated from its environment by means of an air gap and/or creepage distance, meaning that more space is required to install this insulation. In addition, known grounding switch designs with lubricated switching means regularly have a high maintenance requirement.

When working on the main power switching unit and/or the grounding switching device itself—in particular during the above-mentioned regular maintenance work, e.g. for lubrication purposes—the risk of accidents is higher, since the grounding function of the grounding switching device sometimes can no longer be performed. Typically the main power switching unit or the grounding switching device are disconnected. Even in the case of a grounded electrical line of the power system, e.g. when an overhead line is grounded, the restricted or unavailable functionality of the grounding switching device entails the risk of an electric shock because of a high voltage erroneously generated by an internal energy source.

BRIEF SUMMARY OF THE INVENTION

The object of the invention is to increase personal safety during work on the high voltage device in a constructively simple manner.

To this end it is proposed that the at least one high voltage component of the high voltage device has at least one receiving region in which the switching means of the grounding switching device is accommodated—at least in a grounding position grounding at least one active section of the high voltage component. This means increased safety can be achieved when working on the high voltage device, in particular if this work is being undertaken on the main power switching unit. During this work too, a reliable grounding of the at least one active section of the high voltage component can be achieved. This can additionally be achieved in a constructively simple manner by integrating the switching means in the high voltage component—at least in its grounding position. Particularly advantageously the high voltage device can be constructed more compactly in the region of the main power switching unit, since the space needed for the grounding switching device, in particular a necessary air gap and/or creepage distance, can be dispensed with. Typical values for traditional air gap and creepage distance are 230 mm and 600 m respectively. This space saving can advantageously be used for an embodiment of the high voltage device—at least in the region of the main power switching unit—as a device encapsulated in an insulating material.

A "high voltage" should in particular be understood as an electrical voltage ranging from 500 V to 30 kV. The high voltage provided by a power system for the supply of electrically driven vehicles can have the following typical values. Typical values for alternating voltages lie in the range between 10 kV and 30 kV. For rail vehicles voltages of 15 kV or 25 kV are in widespread use. For direct voltages the typical values for a power system range from 500 V to 5 kV. Widely used voltages for the supply of rail vehicles are in particular 750 V, 1.5 k V and 3 kV.

A "high voltage component" should be understood as a component which has at least one section which is designed to conduct a high voltage.

The term "main power switching unit" in respect of an electrical system of a vehicle refers in particular to a power switch unit which can interrupt or produce an electrical connection of the electrical system to the power system. It is expediently embodied as a power circuit breaker which is designed to disconnect the electrical connection when the electrical system is subject to a full load. In the closed state the main power switching unit conducts the high voltage provided by the power system and hence forms a component of the high voltage device of the vehicle. In the case of rail vehicles the main power switching unit is in particular called the "main switch" in technical language.

The high voltage component, in which the receiving region is provided to accommodate the switching means of the grounding switching device at least in the grounding position, and the main power switching unit are expediently two different high voltage components of the high voltage device of the vehicle. In particular they are arranged at a distance from one another and/or they each have a different housing.

An "active" section of the high voltage component should be understood in particular as a section which contributes to the transmission of energy, preferably to the production of a flow of energy from the power system to electrical consumers, in particular to at least one drive unit of the vehicle. To this end the active section is in particular designed to conduct an electrical current, via which electrical power of the electrical consumers can be generated. In particular an active section of further components of the high voltage component should be distinguished, which have a protective function. In particular an active section of the high voltage component differs from a housing unit which if appropriate has to be grounded because of regulations on protection against accidental contact.

"Grounding" should in particular be understood as the production of an electrical connection of an active section with a reference potential designed to conduct voltage. Said reference potential may correspond to the potential of the soil, wherein it is in particular called "ground potential", and in rail vehicles to the track potential and/or the potential of a particular device, e.g. of a car body, of the vehicle, wherein it is in particular called "frame potential".

The switching means can be switched in an electrical connection, by which the active section and the main power switching unit can be connected to one another. In this case it has a closed position, in which said electrical connection is produced, and an open position, in which the electrical connection is interrupted and the active section is connected to a reference potential. The open position here corresponds to the grounding position of the switching means. However, it is preferably proposed that in the grounding position the switching means grounds at least one electrical connection between the active section and the main power switching unit. In this way a grounding at least of the active section of the high voltage component and of the main power switching unit can advantageously be achieved.

The receiving region is provided to accommodate the switching means at least in the grounding position which grounds at least the active section of the high voltage component. For example, the switching means can be located in an initial position outside the receiving region, wherein starting from the initial position it is introduced into the receiving region to reach its grounding position in a grounding operation. In a preferred embodiment of the invention it is however proposed that the switching means is encapsulated in the receiving region. In this case the switching means is arranged in the receiving region both in an initial position and in its grounding position. As a result, a particularly compact embodiment can be achieved. In particular the receiving region to accommodate the switching means can correspond to the region of the high voltage component in which the active section is arranged.

Preferably the high voltage component is embodied as a voltage conversion device which serves, starting from the high voltage provided by the power system, to provide a voltage differing therefrom. This means the receiving region can be provided in a widely encountered component which has a central function in electric vehicles and because of its typical dimensions is particularly suitable for implementing the receiving region. Expediently here the high voltage component corresponds to a main transformer, which is connected downstream of the main power switching unit and forms an energy source for the electrical consumers, in particular at least one drive unit and an on-board power supply.

In this connection it is proposed that the high voltage component is provided for inductive voltage conversion. This means a particularly high level of safety can be achieved. This type of high voltage component in the electrical system of the vehicle has the function of an energy source which—even when a power system line is grounded—can potentially conduct dangerous high voltages.

This danger exists in particular when alternating voltages are erroneously applied on the secondary side. Additionally danger exists in the case of a traditional grounding switching device coupled to the main power switching unit according to the prior art when maintenance work is being undertaken on the electrical connection between the voltage conversion device, in particular the main transformer, and the traditional grounding switching device (e.g. working on high voltage plugs, high voltage lines, potheads, conductor rails, etc.), or when components in said connection are damaged. In this case it is possible, because of feedback via the voltage conversion device, that the traditional, albeit properly functioning, grounding switching device cannot perform its function.

In a preferred embodiment of the invention it is proposed that the high voltage component has at least one cooling and/or insulating material which is provided respectively to cool or electrically insulate the active section, wherein the cooling and/or insulating material serves to electrically insulate the switching means. This means that by using one material both for the active section of the high voltage component and for the switching means of the grounding switching device—at least in its non-grounding position—additional space can be saved.

In particular the receiving region for the switching means is at least partially filled with the cooling and/or insulating material. It is advantageous here if the receiving region for the switching means corresponds to the region of the high voltage component, in which at least the active section and preferably other components are arranged.

In an advantageous embodiment of the invention the cooling and/or insulating material is embodied as a cooling and/or insulating liquid. If it is embodied as oil, this can additionally serve as a lubricant in respect of actuation operations of the switching means. As a result, a grounding switching device that requires as little maintenance as possible can be achieved.

In a further embodiment the use of an insulating material embodied as a solid material is conceivable for the switching means. The insulating material can here encompass the receiving region or it can form the receiving region, in that for example the receiving region corresponds to a hollow region, recessed in the insulating material, for the switching means.

BRIEF DESCRIPTION OF THE SEVERAL VIEWS OF THE DRAWING

An exemplary embodiment of the invention is explained in greater detail on the basis of the drawings, in which.

DESCRIPTION OF THE INVENTION

Figure 1:
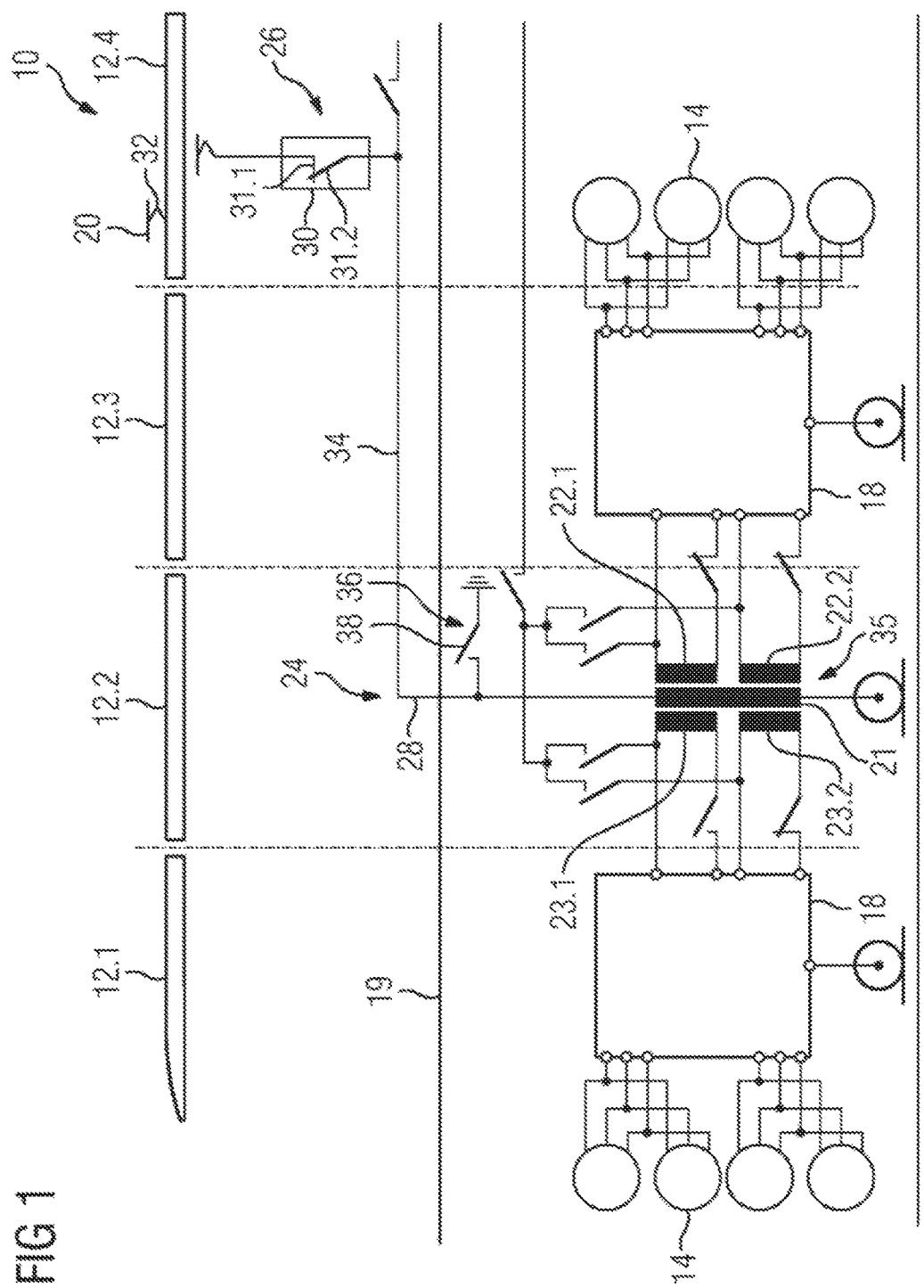
FIG. 1: shows a rail vehicle having an electrical circuit in a schematic side view

FIG. 1 shows a highly schematic side view of a vehicle embodied as a rail vehicle 10 and an electrical circuit thereof. The rail vehicle 10 is embodied as a multiple unit with a plurality of cars 12.1 to 12.4. In the drawing only one half of the set of cars forming the rail vehicle 10 is illustrated, wherein the second half is in principle embodied mirror-symmetrically to the first half. The following description is hence restricted to the embodiment of the first half of the vehicle. In both halves the lead car 12.1 and a center car 12.3 are fitted with drive motors 14. In a traction operation these are each mechanically coupled to a wheel axle to drive the same, wherein pairs of drive motors 14 are each arranged in a motor bogie.

The drive motors 14 are supplied with electrical power in the traction operation in a known manner by means of a power supply unit 18, wherein separate units 18 are provided in each case in the driven cars 12.1 and 12.3 in each case for two pairs of drive motors 14 or for the motor bogies of said cars. The power supply units 18 preferably contain at least one rectifier and a pulse controlled inverter which in each case are formed by components of a power electronics system. Said components are known in the prior art and are not illustrated in greater detail in the figures and this text. The power supply units 18 each physically assume the form of a traction power converter container which in the drawing is illustrated with its inputs and outputs. Said containers are in the embodiment under consideration arranged underneath the vehicle roof 19, wherein they can be arranged in the underframe region or—in particular in the case of a double-decker vehicle—in the car body. Alternatively at least one of said containers can be arranged on the vehicle roof.

The power supply units 18 are supplied with electrical energy via an electrical signal which is provided by a voltage conversion device. In the traditional design of a traction system of an electrical rail vehicle this corresponds to the so-called "main transformer". This is provided for the inductive conversion of a high voltage tapped from a power system 20 into a different, stepped-down voltage which is conducted to inputs of the power supply units 18. To this end the voltage conversion device has a primary winding 21 which conducts the high voltage of the power system 20, and secondary windings 22.1, 22.2, 23.1, 23.2 which conduct the stepped-down voltage. A pair of secondary windings 22.1, 22.2 is associated with the power supply unit 18 of the center car 12.3, while a further pair of secondary windings 23.1, 23.2 is associated with the power supply unit 18 of the lead car 12.1.

As described above, the primary winding 21 of the voltage conversion device conducts the mains voltage which is tapped by the power system 20. The voltage conversion device is hence a high voltage component 24 of the high voltage device 26 of the rail vehicle 10. The high voltage component 24 is arranged underneath the roof 19 in the embodiment under consideration and as already explained above for the power supply units 18 can be arranged in the underframe region or in the car body. The mains voltage is conveyed to the primary winding 21 by means of an electrical connection 28. This connects the primary winding 21 to a main power switching unit 30 which serves to interrupt or produce the supply of the electrical system of the rail vehicle 10 with the high voltage of the power system 20. In technical language the main power switching unit 30 is also called the "main switch". In a known embodiment this can have contact means 31.1, 31.2 that move in respect of one another, and which in particular are arranged in a vacuum chamber or in a chamber filled with gas, and a drive unit for effecting a relative movement of the contact means 31.1, 31.2 (not shown in greater detail in the figure). The main power switching unit 30 is a further high voltage component, differing from the high voltage component 24 and structurally separate therefrom, of the high voltage device 26. By means of the main power switching unit 30 the high voltage component 24 embodied as a voltage conversion device can be electrically connected to the power system 20 or disconnected therefrom. An electrical contact of the rail vehicle 10 with the power system 20 takes place in a known manner by means of a contact unit 32, which in the embodiment illustrated of the power system 20 is embodied with an overhead line as a roof-supported current collector. The contact unit 32 is a further high voltage component of the high voltage device 26 of the rail vehicle 10. In a further embodiment the power system 20 can be embodied with a conductor rail arranged in the track bed region.

In respect of a flow of energy present at least in a traction operation of the rail vehicle 10 from the power system 20 to at least one of the power supply units 18 the contact unit 32, the main power switching unit 30 and the high voltage component 24 are arranged one after the other in series. Expressed differently, the main power switching unit 30 is—in respect of this flow of energy—switched between the high voltage component 24 and the contact unit 32. In the embodiment under consideration of the rail vehicle 10 as a multiple unit the high voltage device 26 of the rail vehicle 10 has a high voltage conductor rail 34, which is provided to distribute the high voltage of the power system 20 to a plurality of cars 12. It serves in particular to conduct the high voltage tapped via the contact unit 32 to a further high voltage component, which corresponds to the high voltage component 24 in the other half of the train (not shown). The electrical connection 28 between the high voltage component 24 and the main power switching unit 30 is effected via a section of the high voltage conductor rail 34.

The high voltage device 26 of the rail vehicle 10 further has a grounding switching device 36 which serves to ground at least one section of the high voltage device 26. This has an actuatable switching means 38, by which an active section 35 of the high voltage component 24 can be electrically connected to the frame potential of the rail vehicle 10. The active section 35 of the high voltage component 24 is formed at least by the primary winding 21. An electrical connection between the electrical connection 28 and the frame potential is produced in the grounding position of the switching means 38, meaning that the electrical connection 28 and with it the active section 35 of the high voltage component 24 and the main power switching unit 30 are grounded.

Figure 2:
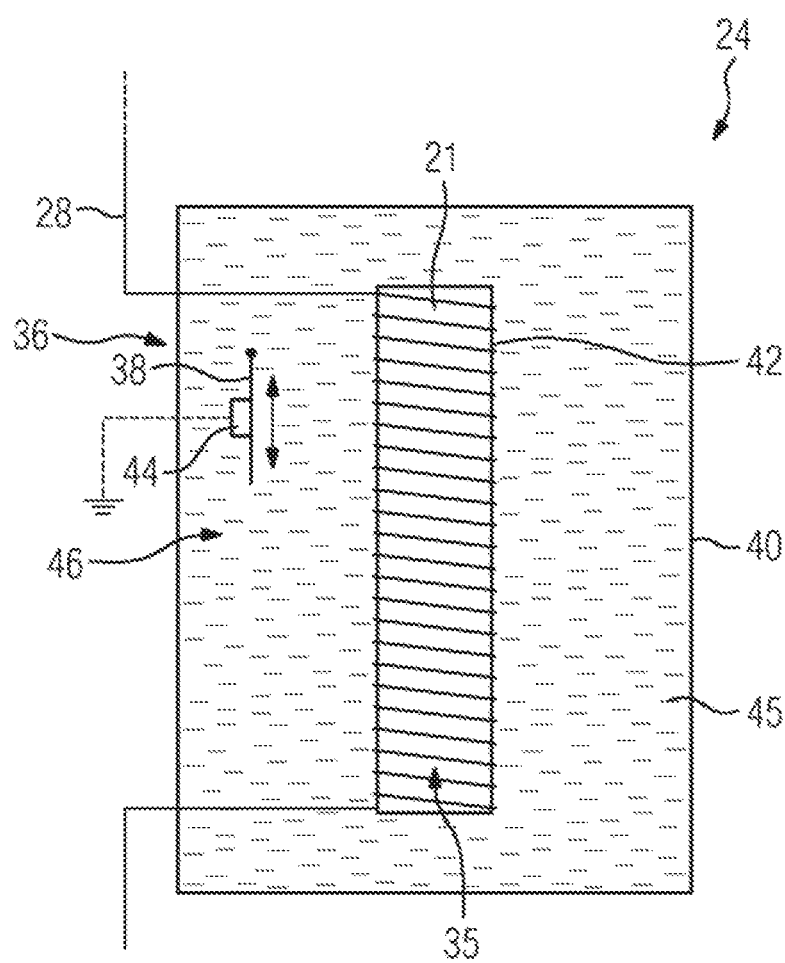
FIG. 2: shows a high voltage component of the rail vehicle, having a grounding switching device.

The high voltage component 24 and the grounding switching device 36 are illustrated in greater detail in FIG. 2. As described above, the high voltage component 24 is embodied as a transformer. It has a housing unit 40 which encompasses the internal components, in particular at least the primary winding 21—hence the active section 35—and the secondary windings plus a core 42. In technical language the housing unit 40 in the case of the embodiment under consideration of the high voltage component 24 as a transformer is also called a "transformer tank". The core 42 and the primary winding 21 are illustrated highly schematically in a side view in the figure. Also shown is the electrical connection 28 which connects the active section 35 or the primary winding 21 to the main power switching unit 30, in particular via the high voltage conductor rail 34.

As described above the switching means 38 of the grounding switching device 36 serves—in its grounding position—to connect the electrical connection 28 and with it the active section 35 of the high voltage component 24 to the frame potential and hence to ground it. The grounding switching device 36 with the switching means 38 is illustrated highly schematically in the figure. The switching means 38 is connected to an electrical conductor 44 which is grounded. For example, this electrical conductor 44 can be formed by the housing unit 40. Alternatively the conductor 44 can be embodied separately from the housing unit 40. In an initial position the switching means 38 is disconnected from the electrical connection 28. Starting from the initial position illustrated in the figure it is powered for a movement relative to the fixed conductor 44 into the grounding position, in which it contacts the electrical connection 28 and establishes an electrical connection between said connection 28 and the grounded conductor 44. The actuation can take place manually, semi-automatically or fully automatically. Actuation means to this end are not shown in greater detail in the figure.

The housing unit 40 encloses the internal components of the high voltage component 24, i.e. in particular the primary winding 21, the secondary windings 22, 23 and the core 42. The high voltage component 24 is embodied as a liquid-cooled transformer. The above-mentioned components of the high voltage component 24 are arranged in a bath of a liquid cooling and insulating material 45. In particular said material 45 is embodied as dielectric oil.

The housing unit 40 additionally forms a receiving region 46 for the switching means 38. Said receiving region 46, in which the switching means 38 of the grounding switching device 36 is accommodated, here corresponds to the receiving region for the above-mentioned components of the high voltage component 24, i.e. in particular for the core and the windings, wherein said receiving region contains the cooling and insulating material 45. The switching means 38 is accordingly arranged, like the components of the high voltage component 24, in the bath of the cooling and insulating material 45. The oil used here serves particularly advantageously as a lubricant in respect of sliding movements which take place during the actuation of the switching means 38.

In the above description a rail vehicle has been described which is embodied as a multiple unit. In a further embodiment the rail vehicle can be embodied as a traction unit, e.g. as a locomotive or as a power head of a train set, in which the traction system of the train set is arranged in a concentrated manner. The invention can also be applied in the case of other vehicles, such as trolley-buses for example.

The invention claimed is:

1. A high voltage device for a vehicle which at least during driving operation is supplied with electrical energy from a power system providing a high voltage, the high voltage device comprising:
   a main power switching unit;
   at least one high voltage component, which by means of said main power switching unit can be electrically connected to the power system, and having at least one active section;
   said at least one high voltage component being a voltage conversion device which serves, starting from the high voltage provided by the power system, to provide a voltage different therefrom;
   a grounding switching device having at least one switch configured to assume a grounding position in which said switch grounds an electrical connection between said active section and said main power switching unit; and
   said at least one high voltage component having a housing formed with a receiving region in which said switch is accommodated at least in said grounding position that grounds said at least one active section of said high voltage component, said housing enclosing said at least one active section of said at least one high voltage component.

2. The high voltage device according to claim 1, wherein said switch is encapsulated in said at least one receiving region.

3. The high voltage device according to claim 1, wherein said at least one high voltage component is provided for an inductive voltage conversion.

4. The high voltage device according to claim 1, wherein said at least one high voltage component has at least one cooling and/or insulating material which is provided respectively to cool or electrically insulate said at least one active section, wherein said cooling and/or insulating material serves for electrical insulation of said switch.

5. The high voltage device according to claim 4, wherein said at least one the receiving region is filled at least partially with said cooling and/or insulating material.

6. The high voltage device according to claim 5, wherein said cooling and/or insulating material is embodied as a cooling and/or insulating liquid.

7. The high voltage device according to claim 6, wherein said cooling and/or insulating material is oil.

8. The high voltage device according to claim 1, wherein said high voltage component is a transformer enclosed in said housing, said transformer including a primary winding forming said active section, a secondary winding and a core.

9. A vehicle, comprising:
   a high voltage device which at least during driving operation is supplied with electrical energy from a power system providing a high voltage, said high voltage device containing:
   a main power switching unit;
   at least one high voltage component, which by means of said main power switching unit can be electrically connected to the power system, and having at least one active section;
   said at least one high voltage component being a voltage conversion device which serves, starting from the high voltage provided by the power system, to provide a voltage different therefrom;
   a grounding switching device having at least one switch configured to assume a grounding position wherein said switch grounds an electrical connection between said active section and said main power switching unit; and
   said at least one high voltage component having a housing formed with a receiving section in which said switch is accommodated in the grounding position that grounds said at least one active section of said high voltage component, said housing enclosing said at least one active section of said at least one high voltage component.

10. The vehicle according to claim 9, wherein the vehicle is a rail vehicle.

11. The vehicle according to claim 9, wherein said high voltage component is a transformer enclosed in said housing, said transformer including a primary winding forming said active section, a secondary winding and a core.

* * * * *